United States Patent Office 3,301,854
Patented Jan. 31, 1967

3,301,854
7-(SUBSTITUTED)-1,3,5-TRIAZAADAMANTANES
Norman W. Gabel, 5715 S. Kimbark,
Chicago, Ill. 60637
No Drawing. Filed Apr. 1, 1965, Ser. No. 444,840
4 Claims. (Cl. 260—248)

This invention relates to a novel condensation reaction between nitromethane, formaldehyde or its precursors (e.g. paraformaldehyde) and the salt of a weak acid of ammonia (e.g. acetate, borate, carbonate) which produces 7-nitro-1,3,5-triazaadamantane, a novel and useful compound having the following structural formula:

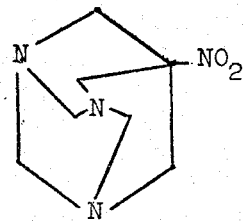

Also included within the scope of this invention is the preparation of 7-amino-1,3,5-triazaadamantane by reduction of the nitro group of 7-nitro-1,3,5-triazaadamantane with lithium aluminum hydride or hydrogen and Raney nickel.

The novel compounds of this invention are both water soluble and lipid soluble, possess unusual heat stability, and complex readily with metal cations. Both compounds are capable of emulsifying and partially solubilizing wet iron oxide sludge in lipoidal solvents. Both compounds form coordination complexes with calcium and magnesium cations in aqueous solution.

The physical properties of these compounds and the ease with which they form coordination complexes with metal cations, specifically ferrous metals and alkaline earths, make them useful as fuel and lubricant additives, corrosion inhibitors, high-temperature grease thickeners, emulsifiers, and water-softeners. The derivatives of 7-amino-1,3,5-triazaadamantane are also useful as side chains for detergents and ion-exchange resins.

The novel compounds of the present invention and their derivatives may also be used as antibacterial and antiviral agents.

This invention is further illustrated by the following examples for the purpose of illustration and not limitation.

EXAMPLE 1

*Preparation of 7-nitro-1,3,5-triazaadamantane*

A mixture of 15 grams (0.25 mole) of nitromethane, 50 grams of paraformaldehyde, 58 grams of ammonium acetate, and approximately 100 ml. of ethanol was stirred and refluxed for 4 hours. The reaction flask was cooled and the precipitate was collected by filtration. The product is then washed with a small amount of ethanol and dried. Sublimation at 140–180° C. yielded 35 grams of product melting at 315° C.

*Analysis.*—Calc.: C, 45.64; H, 6.57; N, 30.42. Found: C, 45.39; H, 6.70; N, 30.42.

Purification could also be accomplished by recrystallization from ethanol, a mixture of benzene and hexane, or water. Methanol or 2-propanol or other low molecular weight polar solvents also serve as solvents for the reaction. When this reaction mixture was refluxed overnight, essentially the same yield of product was obtained.

In an alternative procedure 140 grams of 37% aqueous formaldehyde was added dropwise to a refluxing mixture of the other two reactants in ethanol over a period of two hours. Refluxing was continued for an additional hour after which the solvent was slowly distilled from the reaction flask. The residue was dried and extracted with chloroform. Evaporation of the chloroform and purification as above produced 18 grams of the desired product.

EXAMPLE 2

*Preparation of 7-amino-1,3,5-triazaadamantane from 7-nitro-1,3,5-triazaadamantane*

27 grams of 7-nitro-1,3,5-triazaadamantane was reduced with 13 grams of lithium aluminum hydride in 800 ml. of refluxing anhydrous tetrahydrofuran. The nitro compound was introduced by using a modified Soxhlet-type extractor. The excess hydride was decomposed with concentrated aqueous sodium hydroxide. The tetrahydrofuran solution was decanted from the alumina sludge and evaporated. The residue was either sublimed or recrystallized from a benzene-hexane mixture. M.P. 300–310° C.

*Analysis.*—Calc.: C, 54.52; H, 9.15; N, 36.33. Found: C, 54.63; H, 9.37; N, 36.08.

Alternatively, 10 grams of the nitro compound in 100 ml. of ethanol was reduced with hydrogen (50 lbs. per sq. in.) at 50–60° C. over a period of 5 hrs. using Raney nickel (200 grams) as a catalyst. The mixture was cooled and filtered; and the Raney nickel was washed several times with ethanol. The combined filtrates were evaporated and the residue was purified as above.

EXAMPLE 3

One part by weight of freshly precipitated iron oxide was slurried in 250 parts by weight of dibutyl phthalate, a lipoidal solvent, to which 2.5 parts by weight of the compound of Example 1 was added, and vigorously agitated for 30 minutes. This formed a partial solution and stable emulsion of the moist iron oxide demonstrating use of the compound of Example 1 in the prevention or removal of sludge deposits from internal combustion engines when the compound is employed as a lubricant additive.

EXAMPLE 4

One part by weight of the compound of Example 2 when added to 5,000 parts by weight of water with a total hardness of 133±5 mg. per liter, as calcium carbonate, reduced the hardness to 43±3 mg. per liter as determined by titration with a standardized solution of pure castile soap (1 ml. soap solution = 1 mg. $CaCO_3$). This demonstrates the use of the compound of Example 2 as a water softening agent.

I claim:
1. The method of making 7-nitro-1,3,5-triazaadamantane which comprises reacting nitromethane, formaldehyde, and a weak acid salt of ammonia.
2. 7-nitro-1,3,5-triazaadamantane.
3. 7-amino-1,3,5-triazaadamantane.
4. A compound selected from the group consisting of 7-nitro-1,3,5-triazaadamantane and 7-amino-1,3,5-triazaadamantane.

References Cited by the Examiner

Lukes et al., Chemical Abstracts, Volume 47, column 12393i (1953) QD1.A51.

Stetter et al., Chem. Ber., Volume 84, pages 834 to 839 (1951), QD1.D4.

WALTER A. MODANCE, *Primary Examiner.*

JOHN M. FORD, *Examiner.*